US008602151B2

(12) United States Patent
Linortner (10) Patent No.: US 8,602,151 B2
(45) Date of Patent: Dec. 10, 2013

(54) DRIVE SYSTEM FOR A MOTOR VEHICLE

(75) Inventor: Thomas Linortner, Graz (AT)

(73) Assignee: Magna Powertrain AG & Co KG, Lannach (AT)

( * ) Notice: Subject to any disclaimer, the term of this patent is extended or adjusted under 35 U.S.C. 154(b) by 482 days.

(21) Appl. No.: 13/061,129

(22) PCT Filed: Aug. 28, 2009

(86) PCT No.: PCT/EP2009/006253
§ 371 (c)(1),
(2), (4) Date: Mar. 30, 2011

(87) PCT Pub. No.: WO2010/022967
PCT Pub. Date: Mar. 4, 2010

(65) Prior Publication Data
US 2011/0172045 A1 Jul. 14, 2011

(30) Foreign Application Priority Data
Sep. 1, 2008 (DE) .......................... 10 2008 045 264

(51) Int. Cl.
*B60K 17/35* (2006.01)
(52) U.S. Cl.
USPC ......................................... 180/249; 180/248
(58) Field of Classification Search
USPC ................................................ 180/248, 249
See application file for complete search history.

(56) References Cited

U.S. PATENT DOCUMENTS

| 4,865,176 A | 9/1989 | Blake et al. |
| 5,103,930 A | 4/1992 | Gierer |
| 5,259,476 A | 11/1993 | Matsuno et al. |
| 6,776,252 B1 | 8/2004 | Andonian et al. |
| 6,776,275 B2 * | 8/2004 | Gratzer ........................ 192/103 F |
| 7,949,453 B2 * | 5/2011 | Parigger et al. .................. 701/67 |
| 8,151,965 B2 * | 4/2012 | Linortner et al. .......... 192/85.02 |
| 2009/0045027 A1 * | 2/2009 | Linortner et al. .......... 192/103 F |
| 2009/0048749 A1 * | 2/2009 | Parigger et al. .................. 701/67 |

FOREIGN PATENT DOCUMENTS

| DE | 42 21 883 A1 | 1/1993 |
| WO | WO-2006/004525 A1 | 1/2006 |

* cited by examiner

*Primary Examiner* — J. Allen Shriver, II
*Assistant Examiner* — Conan Duda
(74) *Attorney, Agent, or Firm* — Dickinson Wright (57) ABSTRACT

A drive system for a motor vehicle with a continuously driven primary axle and a selectably driven secondary axle has a differential that acts between the wheels of the secondary axle, and has a torque transmission device for transmitting a drive torque to the differential. The torque transmission device has a clutch and a pump, wherein the pump produces a hydraulic pressure in a first pressure chamber of the clutch when a speed difference occurs between the primary axle and the secondary axle. The first pressure chamber is connected via a connecting line to a second pressure chamber, which is associated with an actuating member of the differential, so that the pressure produced by the pump also permits an at least partial locking of the differential. The first pressure chamber is connected to a low-pressure chamber through a first discharge line, in which is arranged a first control valve. The second pressure chamber is connected to the low-pressure chamber through a second discharge line, in which is arranged a second control valve. A pressure reduction member is located in the connecting line between the first pressure chamber and the second pressure chamber, in the first discharge line, or in the second discharge line.

14 Claims, 6 Drawing Sheets

DRIVE SYSTEM FOR A MOTOR VEHICLE

CROSS-REFERENCE TO RELATED APPLICATIONS

This application is a National Stage of International Application No. PCT/EP2009/006253, filed Aug. 28, 2009. This application claims the benefit and priority of German Pat. App. No. 10 2008 045 264.5, filed Sep. 1, 2008. The entire disclosures of each of the above applications are incorporated herein by reference.

FIELD

The present disclosure relates to a drive system for a motor vehicle with a continuously driven primary axle and a selectably driven secondary axle.

BACKGROUND

A torque transmission device selectably transmits drive torque provided by an internal combustion engine, for example, to a secondary axle, namely to a differential that acts between the wheels of the secondary axle. Such a torque transmission device can have a clutch—in particular a plate clutch—and a pump that responds to a speed difference between the primary axle and the secondary axle of the vehicle (for example, between an input element and an output element of the clutch). When such a speed difference arises, the pump creates a hydraulic pressure in a pressure chamber of the clutch (hereinafter referred to as the first pressure chamber). This pressure permits actuation of the clutch. A pressure rise in the first pressure chamber caused by a speed difference between the primary axle and the secondary axle thus effects engagement of the clutch and hence an increase in the portion of the drive torque transmitted to the secondary axle. Since the engagement of the secondary axle or the gradual locking of the clutch contributes to once again reducing the speed difference between the primary axle and the secondary axle, such an arrangement is essentially self-regulating in operation.

A torque transmission device may be hydraulically coupled to an actuating member to permit an at least partial locking of the differential of the secondary axle. In this way, the traction of the vehicle can be increased further by reducing a speed difference between the wheels of the secondary axle. The actuating member can likewise be a plate clutch. Associated with the actuating member is a pressure chamber, which is hereinafter referred to as the second pressure chamber. The first pressure chamber (which is to say the pressure chamber of the clutch of the torque transmission device) and the second pressure chamber (pressure chamber of the actuating member of the differential) are hydraulically coupled through a connecting line.

To be able to deactivate an automatic four-wheel drive, for example, in the event of intervention by a higher-level vehicle dynamics controller or for reasons of convenience, the first pressure chamber can be connected to a low-pressure chamber (e.g., a sump) through a discharge line. Located in this discharge line is a control valve that can be opened to reduce the pressure in the first pressure chamber (and, via the connecting line, ultimately in the second pressure chamber as well), even when a speed difference is present between the primary axle and the secondary axle. The second pressure chamber can also be connected to the low-pressure chamber through an additional discharge line to be able to reduce the pressure in the second pressure chamber and thereby release a prior locking of the differential.

EP 1,320,470 B1 (corresponding to U.S. Pat. No. 6,776, 275 B2) describes a drive system of the aforementioned type.

While the prior art drive systems already permit satisfactory driving characteristics, it is desirable to further simplify the construction of such drive systems while also being able to establish various traction characteristics so as to be able to react appropriately to different driving conditions.

SUMMARY

It is an object of the present disclosure to create a drive system that permits the establishment of different traction characteristics using a simple design.

This object is attained by a drive system including a passive pressure reduction member that is arranged in the connecting line between the first pressure chamber and the second pressure chamber, in the first discharge line, or in the second discharge line.

Thus, in the drive system according to the present disclosure, the first pressure chamber (pressure chamber of the clutch) is connected through a first discharge line to the low-pressure chamber, and the second pressure chamber (pressure chamber of the actuating member of the differential) is also connected to the low-pressure chamber through a separate, second discharge line. An individual control valve (first or second control valve) is provided in each of these two discharge lines, and specifically in a section separate from the connecting line. This permits especially simple and robust control of the drive system in order to activate or deactivate an automatic four-wheel drive and in order to be able to set two different traction characteristics with the four-wheel drive activated. Specifically, the longitudinal distribution of torque via the clutch can be activated by means of one of the two control valves. If the clutch is activated, the clutch characteristic can be set by the other control valve and/or the actuating member of the differential can be activated to at least partially lock the differential.

The drive system has an especially simple design, since only two simple control valves are needed.

A pressure reduction member may be arranged in the connecting line between the first pressure chamber and the second pressure chamber, or in the first discharge line, or in the second discharge line. In this way, two different characteristics can be set for the clutch of the torque transmission device, which is to say two different dependencies of the clutch torque (hence of the torque transmitted by the clutch) on the speed difference (between the input element and the output element of the torque transmission device). Specifically, an intermediate characteristic is produced when the hydraulic fluid is discharged from the first pressure chamber (pressure chamber of the clutch) via the pressure reduction member. The pressure reduction in the first pressure chamber is only possible to a limited extent by this means. The torque transmission device is thus active. However, only a small portion of the drive torque is transmitted to the secondary axle. This operating state can be established in that the applicable control valve is closed (to unconditionally activate the torque transmission device) and in that the other respective control valve is opened (to permit a limited pressure reduction for the clutch of the torque transmission device via the pressure reduction member). Because the other control valve is open, the actuating member of the differential is not activated, or is only activated to a limited extent, depending on whether the pressure reduction member is located in the connecting line (which is to say ahead of the actuating member in the flow direction) or in one of the two discharge lines.

In contrast, a steep clutch characteristic of the torque transmission device can be set in that both the first control valve and the second control valve are closed, to thus largely prevent a pressure reduction in the hydraulic system (first pressure chamber and second pressure chamber). As a result, a maximum proportion of the drive torque is transmitted to the secondary axle. Because of the hydraulic coupling of the second pressure chamber to the first pressure chamber, maximum locking of the differential also takes place. In this way, the vehicle is thus brought into a state of maximum traction.

In order to set the two different traction characteristics described above, all that is required is actuation of the aforementioned two control valves, resulting in especially simple control. In particular, it is possible to change between the different clutch characteristics by simple ON/OFF switching of the control valves.

Because of the capability to set two different traction characteristics of the drive system, a soft transition to the above-described maximum traction is also possible, namely in that the above-described intermediate clutch characteristic (one control valve closed, the other control valve open) is set temporarily during a change between a deactivated torque transmission device (first and second control valve open) and maximum traction (first and second control valve closed). The pressure reduction member has a damping effect here.

Since the control valves in the discharge lines are located outside of the connecting line, the hydraulic pressure in the second pressure chamber (pressure chamber of the actuating member of the differential) is always determined by the pressure in the first pressure chamber (pressure chamber of the clutch), regardless of the switching state of the two control valves.

Another advantage of such a drive system is that ultimately two discharge lines are available because of the connecting line between the first pressure chamber and the second pressure chamber for the actuating member of the differential. Firstly, the second pressure chamber is connected to the low-pressure chamber, namely via the second discharge line (with the second control valve). Secondly, pressure reduction in the second pressure chamber is also possible via the connecting line and subsequent thereto via the first discharge line (with the first control valve). Consequently, the possibility of pressure reduction in the actuating member of the differential is configured redundantly, which is advantageous from a safety standpoint.

Yet another advantage is that it is simple to bleed air from the second pressure chamber (pressure chamber of the actuating member of the differential). To this end, the first control valve is closed, while the second control valve is open, so that the hydraulic fluid delivered by the pump of the torque transmission device flows through the connecting line into the second pressure chamber and flows back out of the second pressure chamber through the second discharge line, with the air contained in the second pressure chamber being carried along.

The pressure reduction member is designed as a passive element, which is to say without active control of the pressure reduction characteristics. This, too, produces an especially simple construction of the drive system.

The pressure reduction member preferably is arranged in the connecting line between the first pressure chamber and the second pressure chamber. Consequently, as the pressure buildup increases in the first pressure chamber (pressure chamber of the clutch), a delayed pressure buildup takes place in the second pressure chamber (pressure chamber of the actuating member of the differential), when the first control valve and the second control valve are closed. The result is thus achieved that an increasing proportion of the drive torque is initially transmitted to the secondary axle, while the differential of the secondary axle is not locked until after a certain time delay. In this case, the differential lock is deactivated when the second control valve is open.

For some applications, however, it may also be desirable for the clutch of the torque transmission device and the actuating member of the differential to be actuated essentially simultaneously when a speed difference between the primary axle and the secondary axle occurs. In this case, the pressure reduction member can be arranged in the first discharge line or in the second discharge line, which is to say not along the flow path between the first pressure chamber and the second pressure chamber. In this case, the second pressure chamber (actuating member of the differential lock) is also subjected to pressure when an intermediate clutch characteristic is set, namely by closing one control valve and opening the other control valve. Depending on the design (for example, of the release springs of the actuating member), the differential is either partially locked or only locked to a negligible degree.

When it is described in the context of the present disclosure that the pressure reduction member should be located in the connecting line or in the first or second discharge line, this also includes the case where the pressure reduction member is provided at the input or output of the connecting line or of the applicable discharge line, in particular at a branch point, at a control valve, or at an inlet or outlet of the second pressure chamber.

The pressure reduction member may be composed, for example, of a throttle with a constant opening cross-section. According to an especially advantageous refinement of the present disclosure, however, the pressure reduction member is an orifice with a constant opening cross-section and with an essentially temperature-independent leakage characteristic. The leakage of an orifice is generally pressure-dependent. However, it is important that the leakage rate of the orifice (leakage volume/time) is essentially independent of the temperature of the hydraulic fluid. Namely, the temperature dependence of the leakage rate of the pump is mitigated when the hydraulic fluid flows out through the orifice into the low-pressure chamber (first control valve closed, second control valve open). Consequently, the temperature dependence of the shallow clutch characteristic is significantly reduced.

The desired temperature independence of the leakage rate is thus achieved by an orifice that is provided as the pressure reduction member. In contrast to a throttle valve (throttle), for example, this permits only turbulent flow of the hydraulic fluid passing through the orifice so that the flow resistance has virtually no temperature dependence in practice.

Thus, the flow rate Q (=volume per unit time, $\Delta V/\Delta t$) of a turbulent flow through an orifice is calculated as follows:

$$Q = \alpha \cdot A \cdot \sqrt{\frac{2 \cdot \Delta p}{\rho}}$$

Here, $\alpha$ represents the pressure loss coefficient, A the area of the opening cross-section, $\rho$ the density of the fluid, and $\Delta p$ the pressure difference. The pressure loss coefficient $\alpha$ is a dimensionless constant, which depends solely on the geometry of the orifice. It is approximately 0.6 for a sharp orifice. This corresponds to a resistance coefficient $\zeta = 1/\alpha^2$ of approximately 2.7 to 2.8.

In contrast, the flow rate Q of a throttle in the model of a laminar flow through a pipe in accordance with the Hagen-Poiseuille law is:

$$Q = \frac{\pi \cdot r^4}{8 \cdot \eta \cdot l} \cdot \Delta p$$

Here, r represents the radius of the opening cross-section, $\eta$ the dynamic viscosity of the fluid, l the length of the pipe or of the throttle, and $\Delta p$ the pressure difference. Since the dynamic viscosity $\eta$ of the hydraulic fluids that are customarily used is temperature dependent, the flow rate Q of a throttle is also temperature dependent.

According to a preferred embodiment, the orifice has a leakage rate that corresponds approximately to the leakage rate of the pump at the operating temperature of the hydraulic fluid, which is to say when the internal pump leakage is comparatively high. The temperature dependence of the pump leakage, and hence the temperature dependence of the clutch characteristic, is significantly reduced as a result of this measure alone. A suitable leakage rate of the orifice lies in the range from 0.4 to 0.9 l/min (liters/minute) at a pressure difference of approximately 10 bar, for example.

According to another advantageous embodiment, the orifice is replaceable, wherein orifices with different sizes of opening cross-section are used to tune the vehicle driving dynamics, for example in terms of torque transmission to the secondary axle in the event of wheel slip at the primary axle due to high engine output, in the event of high lateral acceleration, or in the event of other dynamic vehicle movements. In other words, it is possible to influence the vehicle driving dynamics merely by exchanging the orifice—with the drive system remaining otherwise unchanged. The drive system, therefore, can be adapted to a specific vehicle model in a simple way. For example, in a vehicle with a continuously driven front axle, a smaller orifice size contributes to handling characterized by oversteering, since the smaller orifice size corresponds to reduced leakage and consequently transmission of a higher proportion of the drive torque to the secondary axle. In contrast, a larger orifice diameter (increased leakage and thus lower pressure in the pressure chamber of the clutch) contributes to handling characterized by understeering.

It is additionally preferred for the orifice to form a passage which has an inside diameter in a range from approximately 0.4 mm to 0.8 mm and a length in a range from approximately 0.2 mm to 0.5 mm. This causes a suitable leakage rate to be produced as a function of the pressure of the hydraulic fluid, with the leakage rate being essentially independent of the temperature of the hydraulic fluid.

An especially simple and economical implementation of the orifice results when the orifice is composed of a hole in a thin plate, which is placed in the flow path of the hydraulic fluid (connecting line or second discharge line), where it extends perpendicularly to the flow direction of the hydraulic fluid. Preferably the plate is made of metal, since this allows especially sharp transitions or edges to be formed at the peripheral boundary of the hole in order to produce the desired turbulent flow.

Alternatively, the orifice can be composed of a hole in a floor section of an essentially cup-shaped insert, which is placed in the flow path of the hydraulic fluid. In an advantageously simple and economical way, an insert of this nature can be manufactured as a deep-drawn metal part, and such an insert also can be secured easily in a line. In this design, the floor section extends essentially perpendicularly to the flow direction of the hydraulic fluid.

The aforementioned plate or the floor section of the aforementioned cup-shaped insert can have a thickness of approximately 0.2 mm to 0.5 mm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
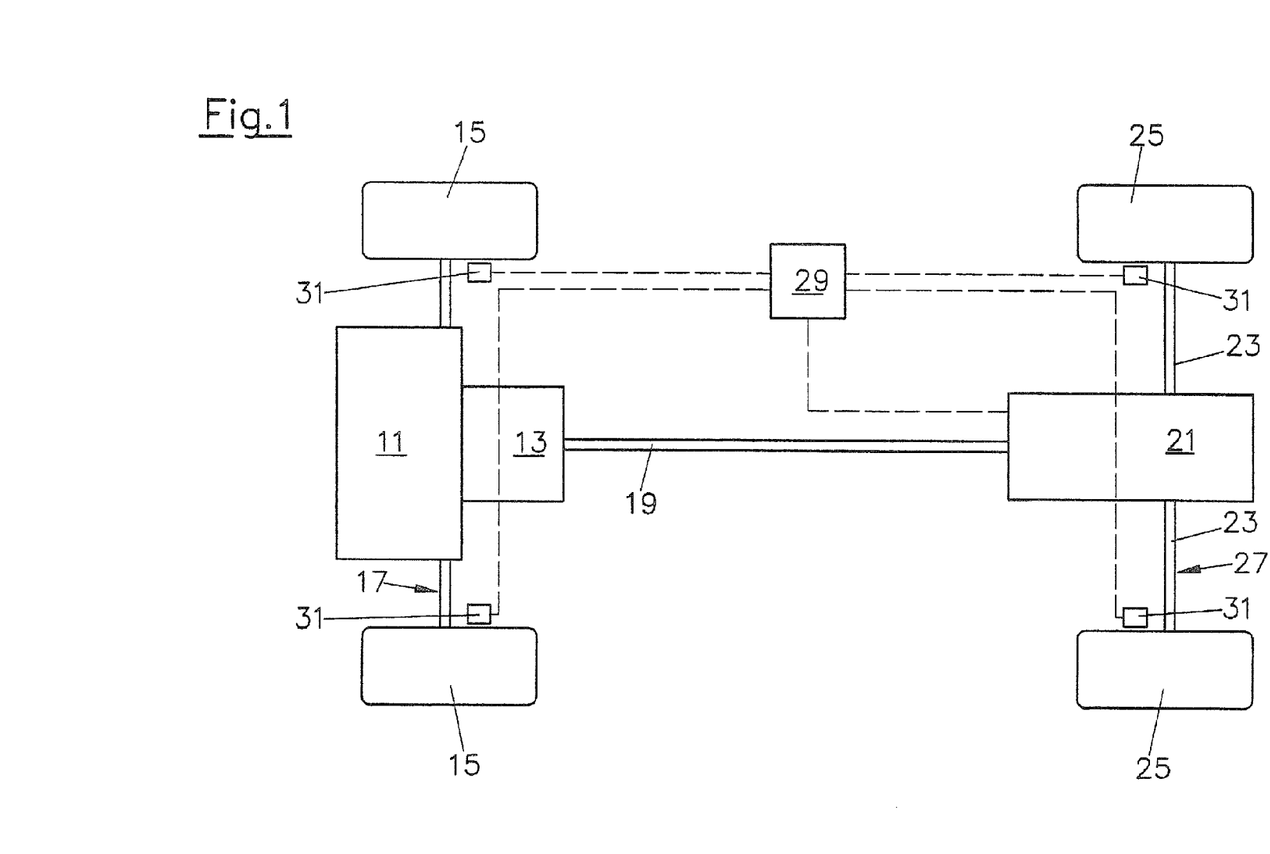
FIG. 1 shows a drive train of a motor vehicle.

FIG. 1 shows a schematic representation of a drive train of a motor vehicle. An engine 11 drives two wheels 15 of a front axle 17 by way of a transmission unit 13 and a front axle differential (not shown). The front axle 17 thus constitutes a primary axle. The engine 11 also drives two half-shafts 23 or two associated wheels 25 of a rear axle 27 by way of the transmission unit 13, a drive shaft 19 and a drive system 21, which is described in detail further below. The rear axle 27 constitutes a secondary axle of the vehicle here. An electronic control unit 29 of the vehicle is connected on the input side to four wheel speed sensors 31, which are associated with the front wheels 15 and the rear wheels 25. The control unit 29 can optionally be connected to additional sensors, for example a steering angle sensor, a yaw rate sensor, etc. (not shown). On the output side, the control unit 29 is connected to the drive system 21. The drive system 21 serves to transmit a portion of the drive torque of the engine 11 to the rear axle 27, namely as a function of control signals from the control unit 29. If a drive torque is transmitted to the rear axle 27 via the drive system 21, the vehicle is operating in four-wheel drive.

Figure 2A:
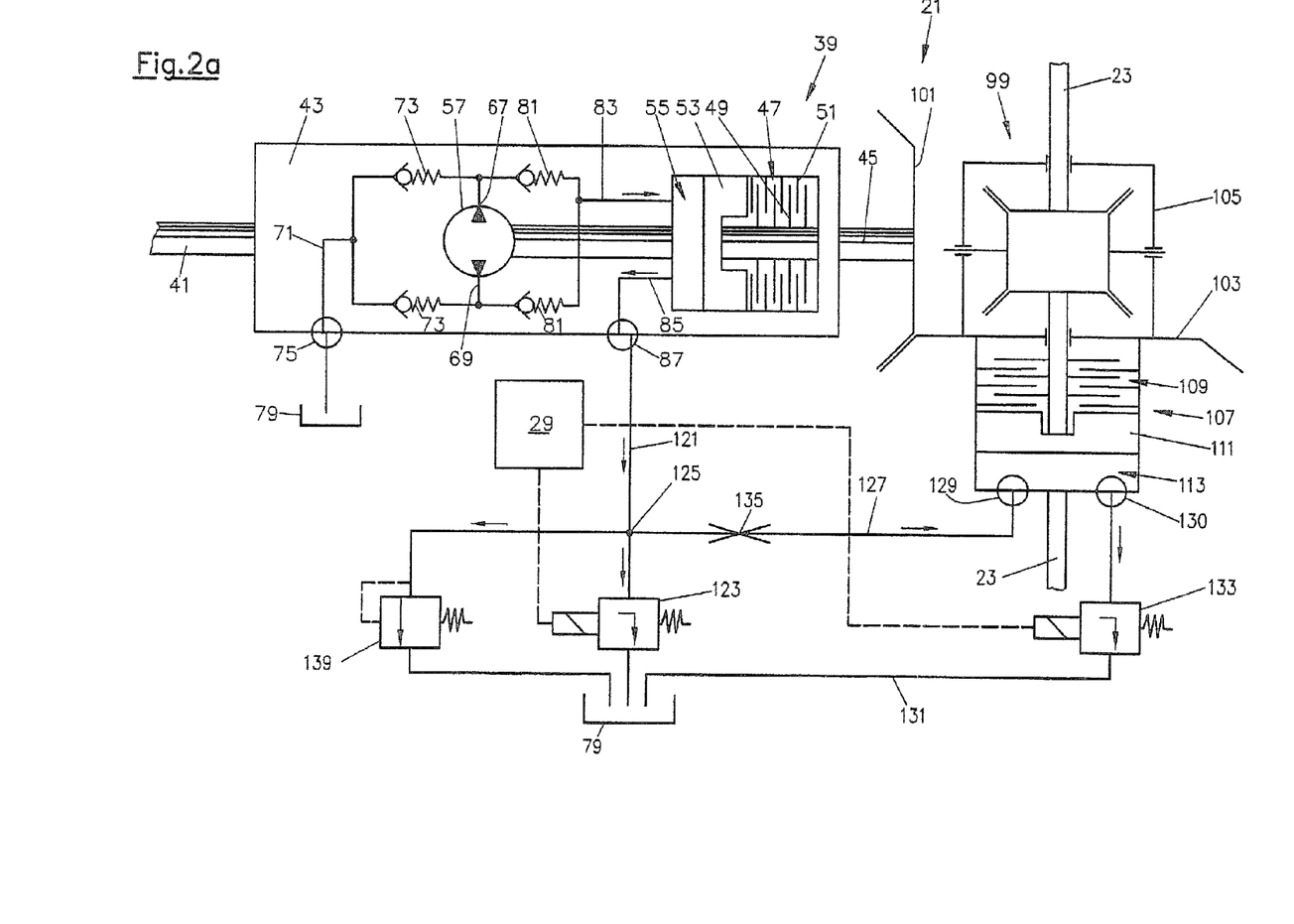
FIGS. 2a to 2c show different embodiments of a drive system with a torque transmission device and a differential.

FIG. 2a shows a schematic representation of an exemplary embodiment of the drive system 21. The drive system 21 has a torque transmission device 39 with an input shaft 41, which is connected in a rotationally fixed manner to the drive shaft 19 as shown in FIG. 1 and to a rotatable inner housing 43 of the torque transmission device 39. The torque transmission device 39 additionally has an output shaft 45, which is rotatable relative to the input shaft 41. The input shaft 41 and the output shaft 45 are rotatably mounted on a stationary outer housing of the torque transmission device 39 (not shown). The torque transmission device 39 additionally has a friction clutch 47 with multiple inner plates 49 and multiple outer plates 51 in an alternating arrangement. The inner plates 49 are connected to the output shaft 45 so as to be axially movable, but rotationally fixed. The outer plates 51 are connected to the inner housing 43 (and thus also to the input shaft 41) so as to be axially movable, but rotationally fixed. The friction clutch 47 additionally has an annular, axially displaceable pressure piston 53, the front side of which selectably presses the inner plates 49 and the outer plates 51 against one another to transmit a torque from the input shaft 41 to the output shaft 45. The rear of the pressure piston 53 faces a first hydraulic pressure chamber 55 of the friction clutch 47.

The torque transmission device 39 additionally has a pump 57. The latter is driven by a rotary motion of the input shaft 41 and the output shaft 45 relative to one another, and in the process generates a hydraulic pressure in the first pressure chamber 55 to move the pressure piston 53 in the direction of engagement of the friction clutch 47. Generally speaking, the pump 57 may be any desired hydraulic pump that responds to a speed difference, in particular a rotary pump or a reciprocating pump. Preferably, the pump 57 is a gerotor pump, whose construction is explained below with reference to FIG. 3.

Figure 3:
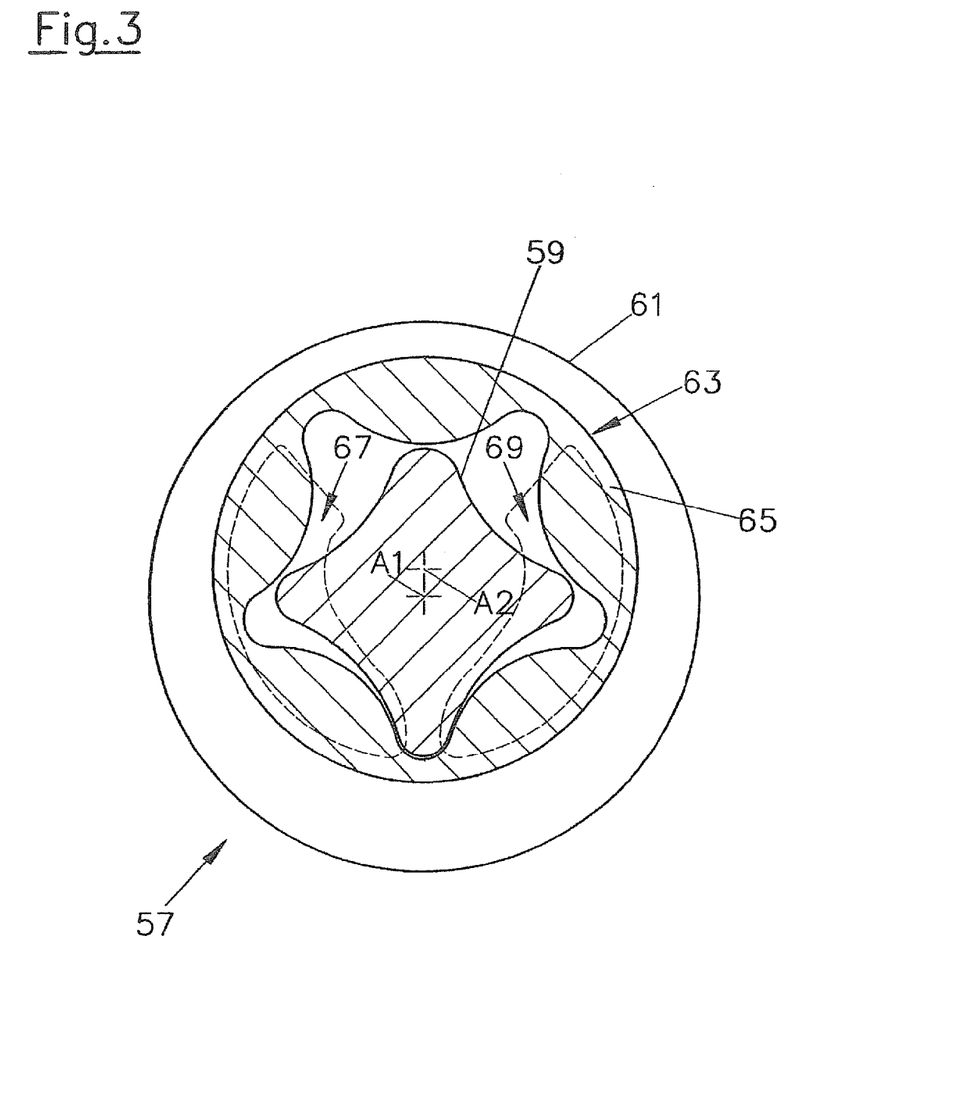
FIG. 3 shows a cross-sectional view of a gerotor pump.

FIG. 3 shows a cross-sectional view of a gerotor pump 57 from FIG. 2a. The pump 57 has an inner rotor 59, which is connected to the output shaft 45 from FIG. 2a in a rotationally fixed manner, and rotates about an axis A1. The pump 57 also has an annular section 61, which is connected in a rotationally fixed manner to the pump housing (not shown) and to the inner housing 43 of the clutch assembly 21 from FIG. 2a, and accordingly also to the input shaft 41. The annular section 61 likewise rotates about the axis A1. The annular section 61 has a circular recess 63, whose center point is offset with respect to the axis of rotation A1. In addition, the pump 57 has an outer rotor 65 that is supported in the recess 63 of the annular section 61 such that it can rotate about an axis A2 and that surrounds the inner rotor 59 and stands in contact therewith. The inner rotor 59 has external teeth, and the outer rotor 65 has internal teeth, wherein the tooth count of the outer rotor 65 is greater by one tooth than the tooth count of the inner rotor 59.

Also visible in FIG. 3 are a first connecting port 67 and a second connecting port 69, which are made in a section of the pump housing that is axially offset with respect to the cross-sectional plane shown in FIG. 3. Depending on the direction of rotation of the inner rotor 59 relative to the annular section 61, the first connecting port 67 serves as the pump inlet and the second connecting port 69 as the pump outlet, or vice versa.

As long as the inner rotor 59 is rotating relative to the annular section 61 and the connecting ports 67, 69, the inner rotor 59 pumps hydraulic fluid, which is provided at one of the connecting ports 67, 69, in the circumferential direction to the other connecting port 69 or 67. This can be attributed to the fact that the hydraulic fluid is confined in a gap that is formed between the inner rotor 59 and the outer rotor 65. Since the volume of this gap changes during the rotation of the inner rotor 59, the hydraulic fluid is drawn out of one connecting port 67, 69 and expelled into the other connecting port 69 or 67. The change in the volume of the applicable gap during the rotation of the inner rotor 59 is attributable, in turn, to the fact that the inner rotor 59 drives the outer rotor 65 with a rotary motion, wherein different rotational speeds are established on account of the different numbers of teeth, i.e., the outer rotor 65 rotating about the axis A2 rotates more slowly than the inner rotor 59.

Once again referring to FIG. 2a, the connecting ports 67, 69 of the pump 57 which were explained in connection with FIG. 3 are also shown here. An intake line 71 is associated with the pump 57. This line is connected to both connecting ports 67, 69 of the pump 57 through an applicable intake-side check valve 73. Opposite the direction of flow of the hydraulic fluid, the intake line 71 is connected to a sump 79 through a rotary joint 75. The sump 79 is located in the aforementioned stationary outer housing of the torque transmission device 39. On the discharge side, the pump 57 is connected by two check valves 81 to a discharge line 83, which leads to the first pressure chamber 55 of the friction clutch 47. From the first pressure chamber 55, the hydraulic fluid can flow into the sump 79 via an outlet 85 and another rotary joint 87, as is explained further below.

First, however, the basic principle of operation of the torque transmission device 39 is described. The pump 57 is driven by a rotary motion of the inner rotor 59 relative to the pump housing with annular section 61 (FIG. 3), corresponding to a rotation of the input shaft 41 relative to the output shaft 45 (FIG. 2a). Referring to FIG. 1, the pump 57 delivers hydraulic fluid when a speed difference exists between the wheels 15 of the front axle 17 on the one hand and the wheels 25 of the rear axle 27 on the other hand. Depending on whether the input shaft 41 rotates faster or slower than the output shaft 45, the hydraulic fluid is drawn in through one of the check valves 73 and conveyed into the first pressure chamber 55 through one of the check valves 81 (FIG. 2a). If the outlet 85 of the first pressure chamber 55 is closed, the pressure piston 53 is moved towards the plates 49, 51 of the friction clutch 47 because of the hydraulic pressure built up in the first pressure chamber 55 to bring the plates 49, 51 into increasing frictional connection with one another. As a result, the input shaft 41 and the output shaft 45 are rotationally coupled to one another to an increasing degree so that a drive torque from the input shaft 41 is transmitted via the clutch assembly 21 to the output shaft 45. This ultimately means a stronger coupling of the rear axle 27 with the front axle 17 (FIG. 1), which in turn contributes to a reduction of the speed difference. Consequently, the torque transmission device 39 is generally self-regulating.

The drive system 21 shown in FIG. 2a additionally has a differential 99 of the rear axle 27 (FIG. 1), which can be driven by the torque transmission device 39. Provided on the output shaft 45 of the torque transmission device 39 for this purpose is a bevel gear 101, which meshes with a ring gear 103, which is connected in a rotationally fixed manner to a cage 105 of the differential 99. The differential 99 is, for example, an ordinary bevel gear differential whose output drive shafts are composed of the two half-shafts 23 of the rear axle 27.

The differential 99 has an actuating member 107, which makes possible an at least partial locking of the differential 99. The actuating member 107 can have a construction that is similar to the clutch part of the torque transmission device 39, which is to say with a friction clutch 109, a pressure piston 111, and a second pressure chamber 113. If a hydraulic pressure is built up in the second pressure chamber 113, this causes a movement of the pressure piston 111 in such a way that the friction clutch 109 is actuated. In this process, the friction clutch 109 increasingly couples the ring gear 103 or the differential cage 105 to the particular half-shaft 23 on which is located the actuating member 107. By this means, the applicable half-shaft 23 is ultimately locked relative to the other half-shaft 23.

Associated with the torque transmission device 39 and the differential 99 is a common hydraulic actuating system. The outlet 85 of the first pressure chamber 55 of the torque transmission device 39 terminates in a first discharge line 121 through the rotary joint 87. The discharge line leads to a sump 79 through a first control valve 123. At a branch point 125 of the first discharge line 121, which is located ahead of the first control valve 123 with respect to the flow direction of the hydraulic fluid, a connecting line 127 branches off and leads to the second pressure chamber 113 of the differential 99 through a rotary joint 129. From the second pressure chamber 113 of the differential 99, a second discharge line 131 likewise leads through a rotary joint 130 to the sump 79, with a second control valve 133 being arranged in the second discharge line 131. The second discharge line 131 is implemented separately from the connecting line 127 and also separately from the first discharge line 121. A passive pressure reduction member in the form of an orifice 135 is located in the connecting line 127 between the branch point 125 and the second pressure chamber 113. The orifice 135 has a simple construction with a constant opening cross-section. Finally, the first pressure chamber 55 of the torque transmission device 39 is connected via the first discharge line 121 and branch point 125 to a pressure relief line 137, which leads to the sump 79. Located in the pressure relief line 137 is a pressure relief valve 139.

The two control valves 123, 133 can be simple 2/2 directional control valves, in particular 2/2 directional seat valves, each of which is preloaded in the opening direction. The two valves 123, 133 are implemented as solenoid valves here, which can be driven electrically by the control unit 29 (FIG. 1). Alternatively, hydraulically driven valves may also be used. As is evident from FIG. 2a, the two control valves 123, 133 may be located in a stationary housing section of the drive system 21, so that no sliding contacts or the like are needed to transmit electric control signals to the valves 123, 133.

The principle of operation of the drive system 21 shown in FIG. 2a is described below.

Figure 4:
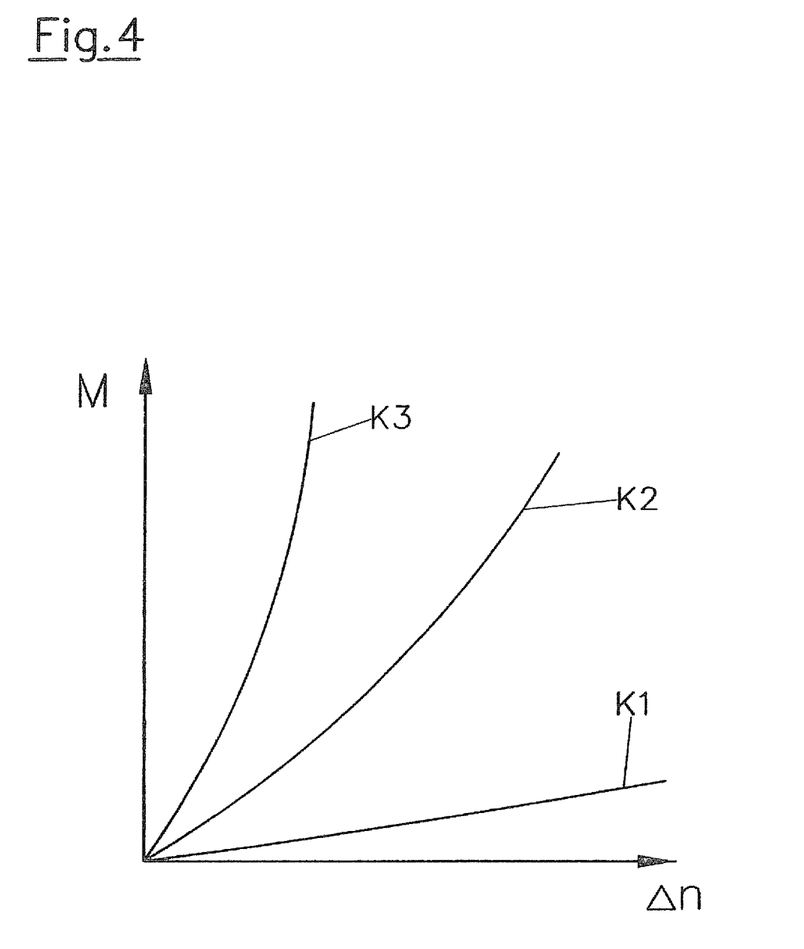
FIG. 4 shows the clutch characteristics that can be set in an embodiment as shown in FIGS. 2a to 2c.

The control unit 29 evaluates various sensor signals in order to ascertain a travel situation of the vehicle, as was explained in connection with FIG. 1. In order to establish two-wheel drive (2WD) operation, the control unit 29 opens the first control valve 123 and the second control valve 133. As a result, the rear axle 27 is essentially decoupled from the drive of the motor vehicle, and the actuating member 107 of the differential 99 is opened, which is to say the two halfshafts 23 of the rear axle 27 are freely rotatable relative to one another. In this state, the dependence of the clutch torque M of the friction clutch 47 of the torque transmission device 39 on the speed difference Δn between the input shaft 41 and the output shaft 45 is determined primarily by drag torques. The result is a very shallow clutch characteristic curve K1, as is shown in FIG. 4.

If the control unit 29 ascertains the necessity for longitudinal stabilization of the vehicle based on the sensor signals, for example when a predetermined speed difference is detected between the wheels 15 of the front axle 17 and the wheels 25 of the rear axle 27, the control unit 29 closes the first control valve 123, while the second control valve 133 remains open. As a result, a certain hydraulic pressure is produced in the first pressure chamber 55 of the torque transmission device 39, since the hydraulic fluid can no longer flow directly into the sump 29 through the control valve 123. Instead, the hydraulic fluid must now pass through the orifice 135. The backpressure thus produced leads to a pressure rise in the first pressure chamber 55 because of the action of the pump 57. Downstream of the orifice 135, however, the hydraulic fluid can flow unhindered via the second discharge line 131 through the open second control valve 133 into the sump 79. The actuating member 107 of the differential 99 thus is not actuated in this state. For the friction clutch 49 of the torque transmission unit 39, an intermediate characteristic curve K2 arises here, which is significantly more steep than the said characteristic curve K1 (even though the first control valve 123 is open), but does not yet correspond to maximum traction (4WD Automatic).

If the control unit 29 ascertains on the basis of the sensor signals that maximum traction with stabilization in the lateral direction as well is required, then the second control valve 133 is closed in addition to the first control valve 123. Since the hydraulic fluid pumped by the pump 57 into the first pressure chamber 55 can no longer flow into the sump 79 as a result, a maximum hydraulic pressure is produced in the first pressure chamber 55, corresponding to a sharply progressive characteristic curve K3 of the friction clutch 47 (see FIG. 4). This means that a large proportion of the drive torque is transmitted to the rear axle 27 even in the case of speed differences between the input shaft 41 and the output shaft 45 (or between the front axle 17 and the rear axle 27). The pressure produced in the first pressure chamber 55 is ultimately also present in the second pressure chamber 113 of the differential 99. This means that the actuating member 107 is now activated as a function of the pump pressure, so that the differential 99 is locked to a corresponding degree (4WD High Traction LSD). In this situation, the orifice 135 brings about a delayed pressure buildup in the second pressure chamber 113, and thus a delayed activation of the actuating member 107.

A particular advantage of the drive system 21 shown here consists in that two clutch characteristic curves K2, K3 of different steepness can be set through the use of two simple control valves 123, 133, while at the same time the differential 99 of the rear axle 27 is locked if maximum traction is set in the longitudinal direction. During switching between the different operating states, the orifice 135 brings about advantageous damping in order to avoid undesirable load surges.

A particular advantage of the use of the orifice 135 as a pressure reduction member consists in the effect of the orifice 135 with regard to temperature compensation. To be specific, the clutch characteristic curves K1, K2 and K3 shown in FIG. 4 are merely represented in idealized form. In actuality, it is necessary to take into account the fact that the pump 57 generally has internal pump leakage as a function of its design. Because of the temperature dependence of the viscosity of the hydraulic fluid, the leakage rate of the pump 57 is strongly temperature dependent. Accordingly, the pump output is also temperature dependent, thus bringing about the abovementioned temperature dependence of the clutch characteristic curves.

Such a strong temperature dependence of the characteristic curve behavior when the torque transmission device 39 is activated is not desirable, since a very different characteristic of the torque transmission and hence of the vehicle's handling would arise depending on the temperature of the hydraulic fluid. However, since the pressure reduction member employed in the connecting line 127 is an orifice 135, which has an essentially temperature-independent leakage characteristic, an additional leakage of the hydraulic fluid from the first pressure chamber 55 is accomplished in a targeted manner when the second control valve 133 is open, thus mitigating the temperature dependence of the leakage rate of the pump 57. The desired temperature independence of the leakage rate of the orifice 135 is based on the fact that the orifice opening—especially in contrast to a throttle—produces turbulent flow, so that the volume flow in the temperature ranges relevant here depends virtually entirely on the pressure of the hydraulic fluid. The resultant temperature dependence of the clutch characteristic curve K2 shown in FIG. 4 is reduced to an acceptable degree by the provision of an orifice 135 as pressure reduction member.

A temperature compensation of this nature is not provided with regard to the characteristic curve K3 in FIG. 4. Nor is this even necessary in practice, however, since the characteristic curve K3 represents an operating state that in any case represents maximum traction and tension of the drive train, so that temperature effects are hardly noticeable.

In order to permit transitions between the different characteristic curves K1, K2 and K3 shown in FIG. 4, it is also possible for the control valves 123, 133 of the control unit 29 to be actuated in a pulse-width modulated manner.

The pressure relief valve 139 is a passive valve, which is provided for safety purposes and has no function with regard to the discussed capability of establishing different characteristic curves K1, K2 and K3 from FIG. 4.

As an alternative to the arrangement from FIG. 2a, the orifice 135 can also be placed in a different position, in particular in the first discharge line 121 (after the branch point 125 and ahead of or behind the first control valve 123 with respect to the direction of flow) or in the second discharge line 131 (after the actuating member 107 and ahead of or behind the second control valve 133 with respect to the direction of flow). In general, the orifice 135 should be placed after the branch point 125 and before the sump 79 with regard to the flow direction of the hydraulic fluid. This is shown in FIGS. 2b and 2c, with similar parts to those in FIG. 2a being labeled with the same reference characters.

Figure 2B:
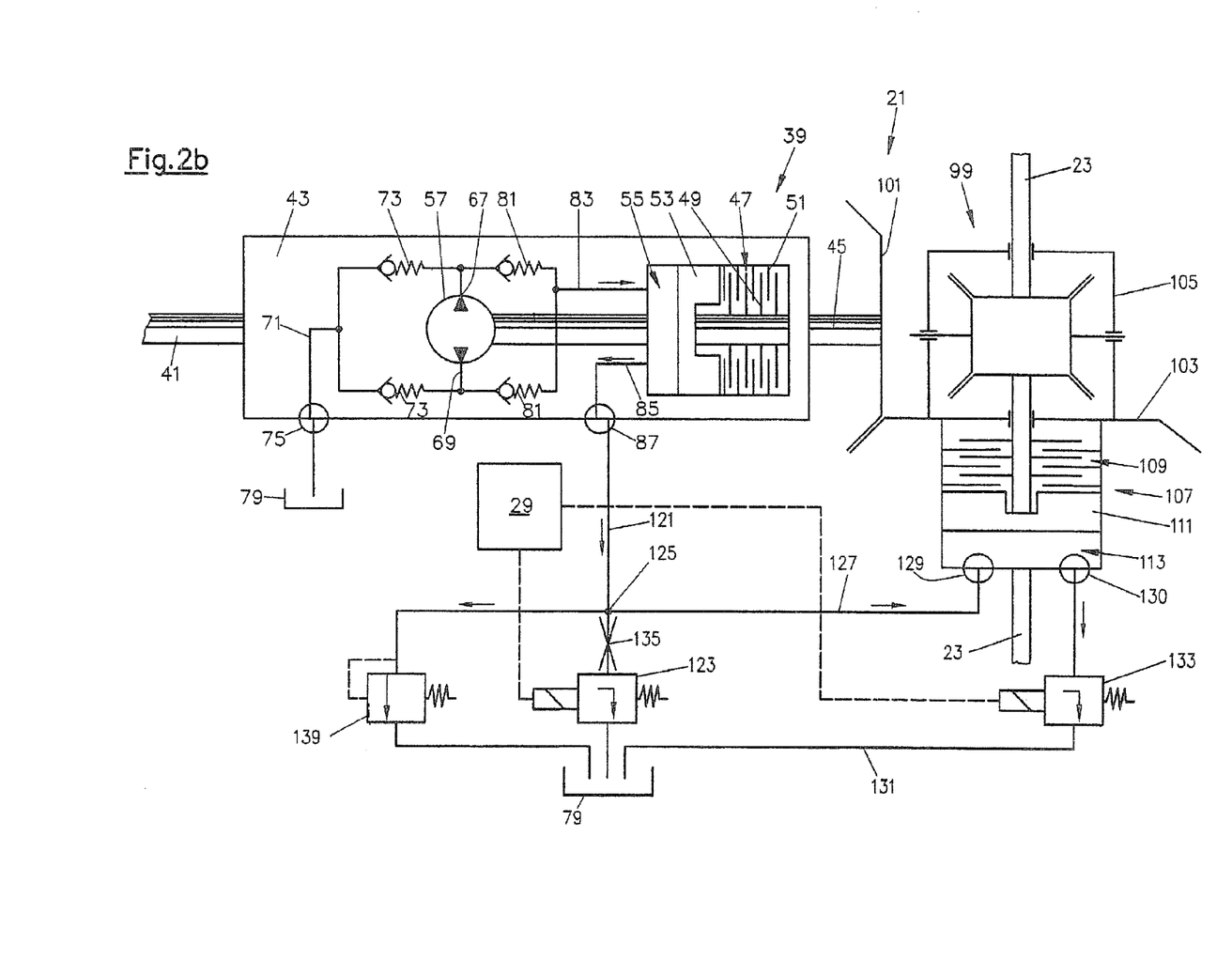
Figure 2C:
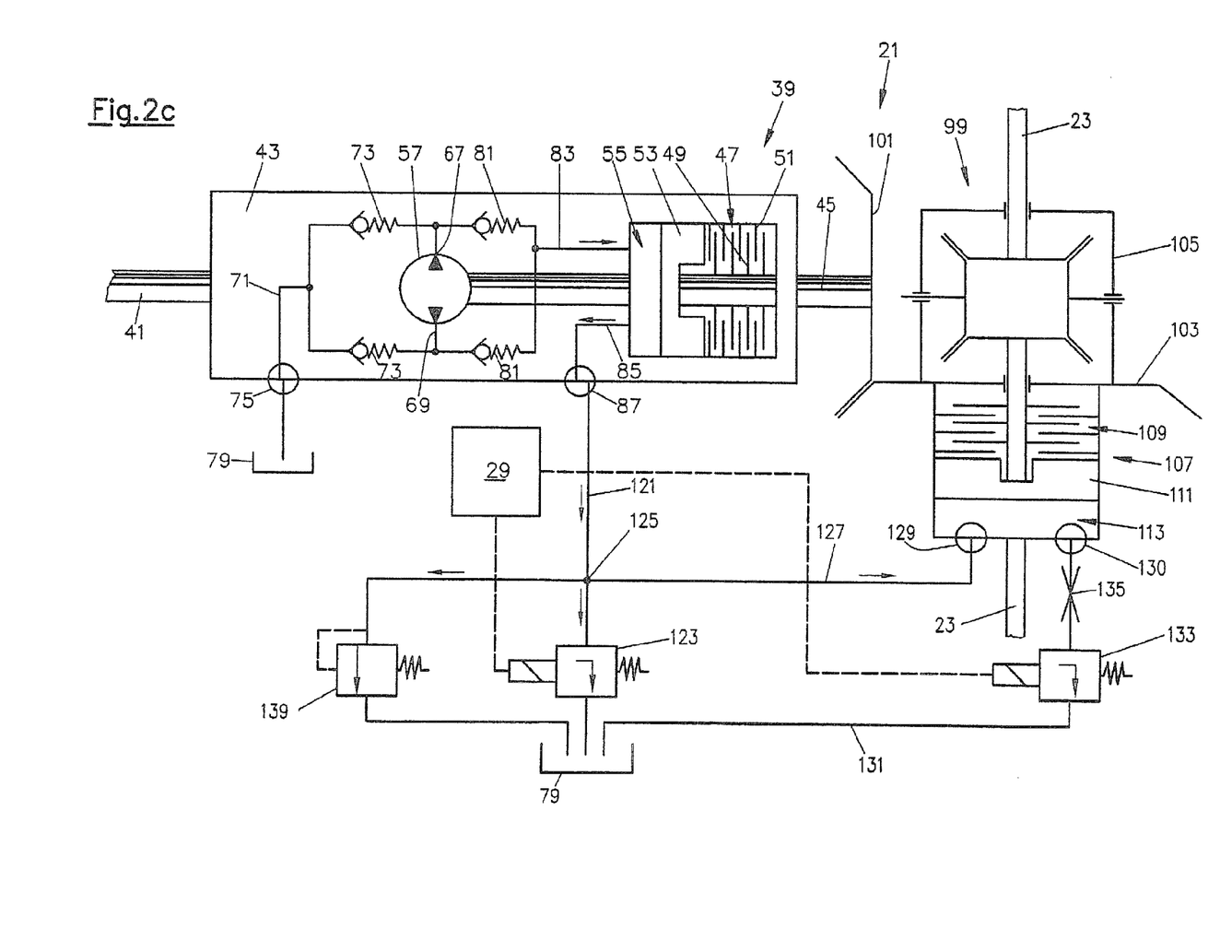

In FIG. 2b, the orifice 135 is located after the branch point 125 in the first discharge line 121. When both control valves 123, 133 are open, two-wheel drive is established (as in FIG. 2a), corresponding to the shallow clutch characteristic K1 shown in FIG. 4. This is also the case when only the first control valve 123 is closed.

However, if the control unit 29 closes the second control valve 133 while the first control valve 123 is open, then a certain pressure is produced with regard to the flow direction of the hydraulic fluid ahead of the orifice 135, and this pressure has effect both in the first pressure chamber 55 of the torque transmission device 39 and in the second pressure chamber 113 of the differential 99. For the friction clutch 49 of the torque transmission unit 39, an intermediate characteristic curve K2 arises here as shown in FIG. 4. In this state, the actuating member 107 of the differential 99 is activated correspondingly weakly.

If the control unit 29 closes the first control valve 123 and the second control valve 133, the hydraulic fluid pumped by the pump 57 into the first pressure chamber 55 can no longer flow into the sump 79. As a result, a maximum hydraulic pressure is produced in the first pressure chamber 55 and in the second pressure chamber 113, which corresponds to a sharply progressive characteristic curve K3 of the friction clutch 47 (see FIG. 4). The actuating member 107 of the differential 99 is strongly activated to a corresponding degree in order to at least partially lock the differential 99.

In contrast to the arrangement from FIG. 2a, the actuating member 107 of the differential 99 in FIG. 2b is activated without a time delay.

FIG. 2c shows an arrangement that corresponds largely to the one in FIG. 2b with regard to function. In FIG. 2c, the orifice 135 is located in the second discharge line 135. The same operating states can be established as in the embodiment from FIG. 2b as a result. However, the intermediate characteristic K2 is established by the means that the first control valve 123 is closed, while the second control valve 133 is opened.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive system for a motor vehicle comprising: a continuously driven primary axle and a selectably driven secondary axle, having a differential that acts between wheels of the secondary axle and having a torque transmission device for transmitting a drive torque to the differential, wherein the torque transmission device has a clutch and a pump, wherein the pump produces a hydraulic pressure in a first pressure chamber of the clutch when a speed difference arises between the primary axle and the secondary axle, the hydraulic pressure actuating the clutch, wherein the first pressure chamber is connected by a connecting line to a second pressure chamber that is associated with an actuating member of the differential, so that the hydraulic pressure produced by the pump also permits an at least partial locking of the differential, wherein the first pressure chamber is connected to a low-pressure chamber via a first discharge line, wherein a first control valve is arranged in a section of the first discharge line that is implemented separately from the connecting line, and wherein the second pressure chamber is connected to the low-pressure chamber via a second discharge line, wherein a second control valve is arranged in a section of the second discharge line that is implemented separately from the connecting line, wherein a passive pressure reduction member is located in the connecting line between the first pressure chamber and the second pressure chamber, in the first discharge line, or in the second discharge line.

2. The drive system according to claim 1, wherein the first control valve and the second control valve are each implemented as a 2/2 directional control valve.

3. The drive system of claim 2, wherein the 2/2 directional control valves are each 2/2 directional seat valves.

4. The drive system according to claim 1, wherein the first control valve and the second control valve are each preloaded in an opening direction.

5. The drive system according to claim 1, wherein the first control valve and the second control valve are located in a stationary housing section of the drive system.

6. The drive system according to claim 1, wherein the drive system has a control unit operable to:
open the first control valve and the second control valve in order to establish two-wheel drive;
close one of the two control valves and open the other control valve in order to establish four-wheel drive with a shallow clutch characteristic curve and a free or partially locked differential; or
close the first control valve and the second control valve in order to establish four-wheel drive with a steep clutch characteristic curve and an at least partially locked differential.

7. The drive system according to claim 6, wherein the control unit is operable to actuate at least one of the first control valve and the second control valve in a pulse-width modulated manner.

8. The drive system according to claim 1, wherein the pressure reduction member has a constant opening cross-section.

9. The drive system according to claim 1, wherein the pressure reduction member includes an orifice having an essentially temperature-independent leakage characteristic.

10. The drive system according to claim 9, wherein the orifice has a leakage rate that approximately corresponds to the leakage rate of the pump at the operating temperature.

11. The drive system according to claim 9, wherein the orifice is inter-changeable and replaceable by an orifice with a different opening cross-section in order to modify vehicle driving dynamics.

12. The drive system according to claim 9, wherein the orifice includes a passage which has an inside diameter in a range from approximately 0.4 mm to 0.8 mm and a length in a range from approximately 0.2 mm to 0.5 mm.

13. The drive system according to claim 9, wherein the orifice comprises one of: a hole in a plate, which is placed in the flow path of the hydraulic fluid, and a hole in a floor section of a cup-shaped insert, which is placed in the flow path of the hydraulic fluid.

14. The drive system according to claim 1, further comprising a pressure relief line including a pressure relief valve that extends from the first pressure chamber to the low-pressure chamber.

\* \* \* \* \*